Jan. 14, 1941.  E. A. MASON  2,228,606

MOP MAKING MACHINE

Filed Aug. 7, 1936  8 Sheets-Sheet 1

Inventor
Elmer A. Mason,
By Bernard F. Garvey
Attorney

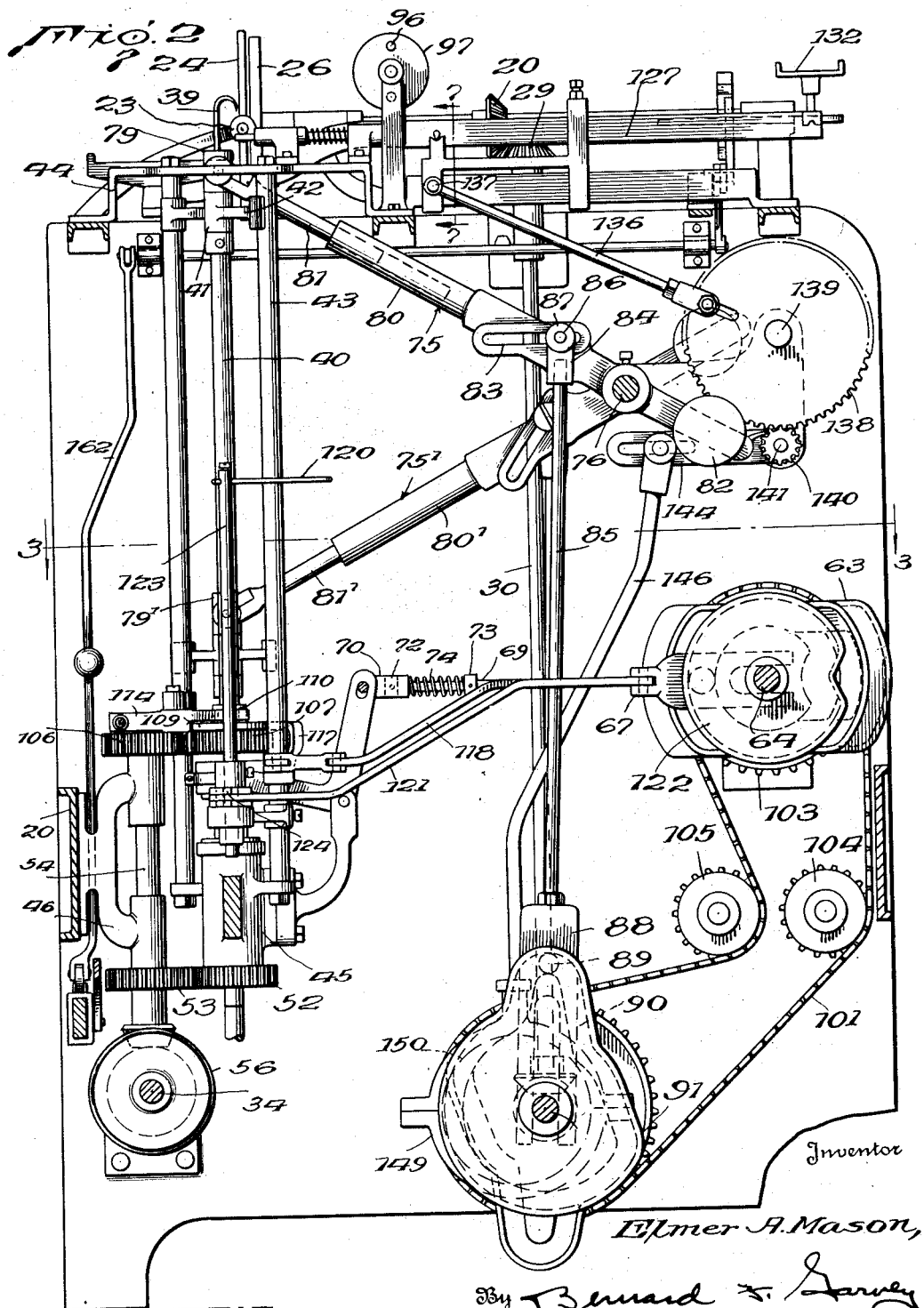

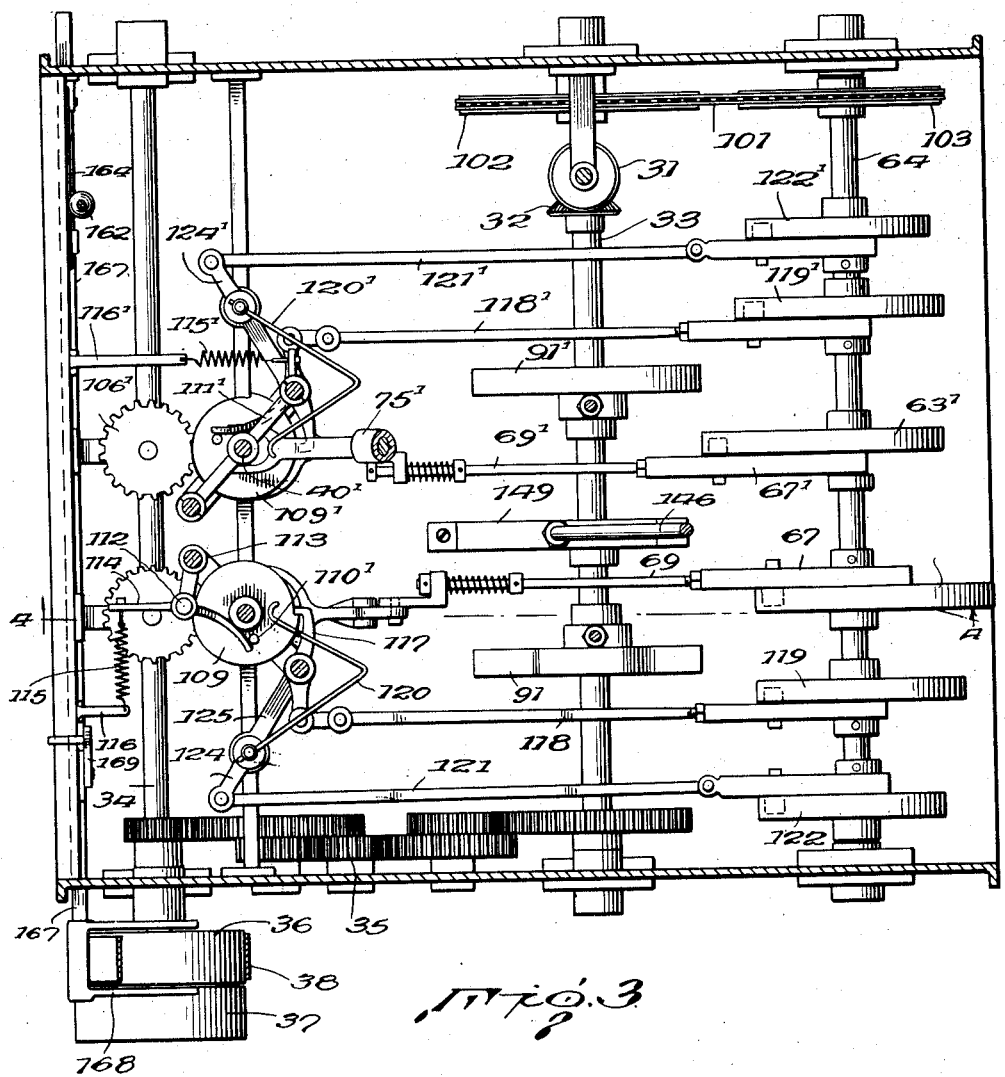

Jan. 14, 1941.  E. A. MASON  2,228,606
MOP MAKING MACHINE
Filed Aug. 7, 1936  8 Sheets-Sheet 4
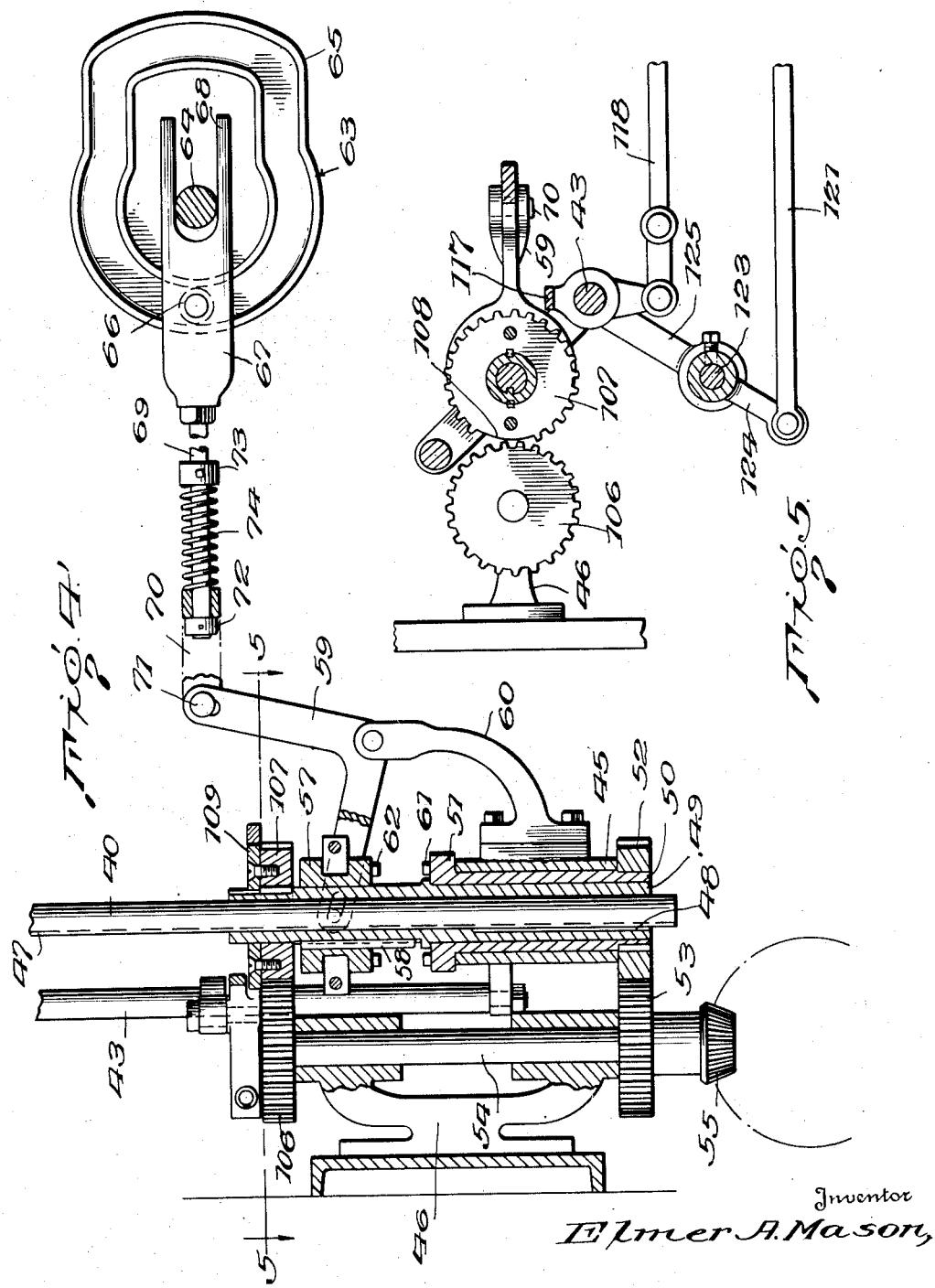
Inventor
Elmer A. Mason,
By Bernard F. Garvey
Attorney

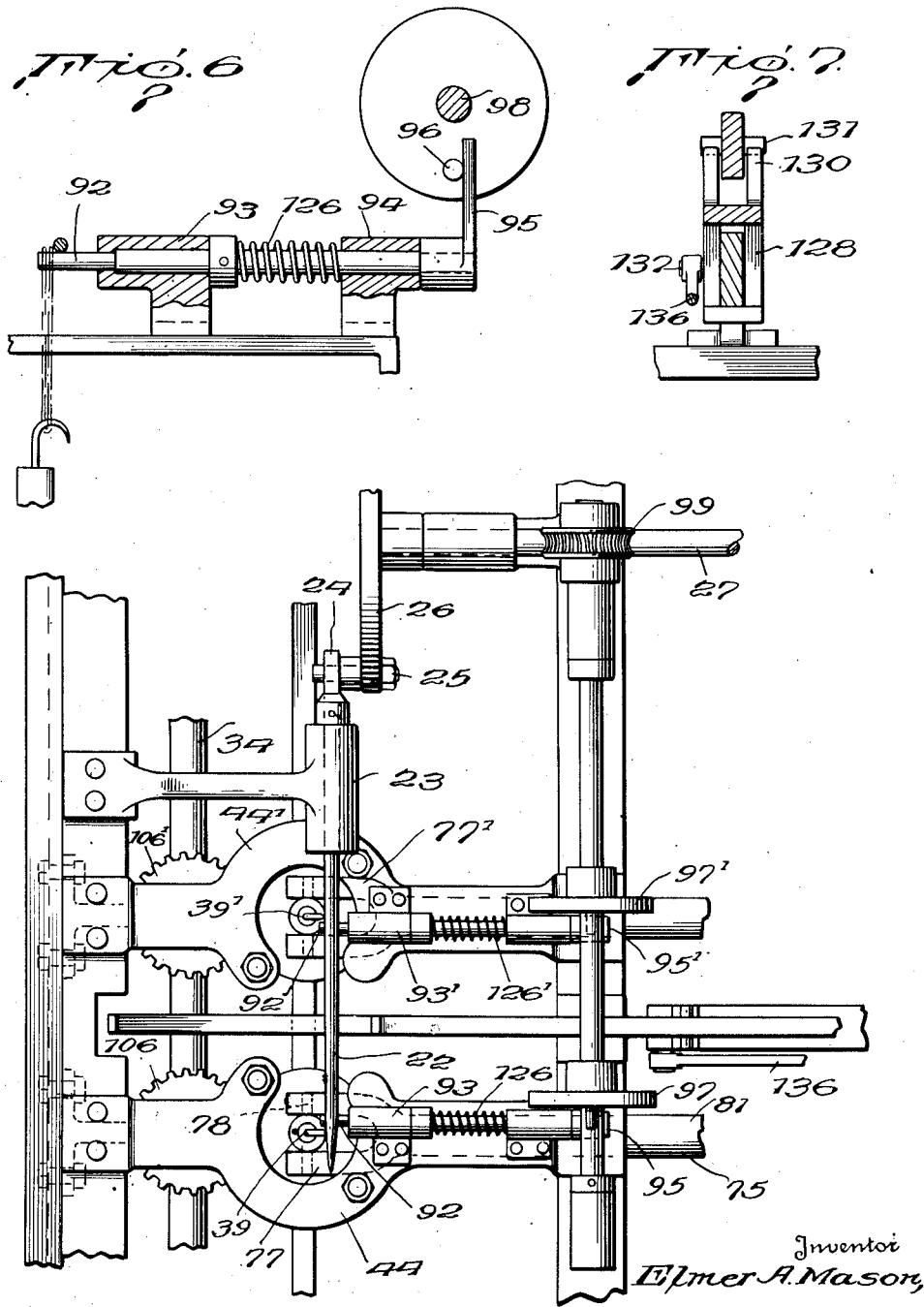

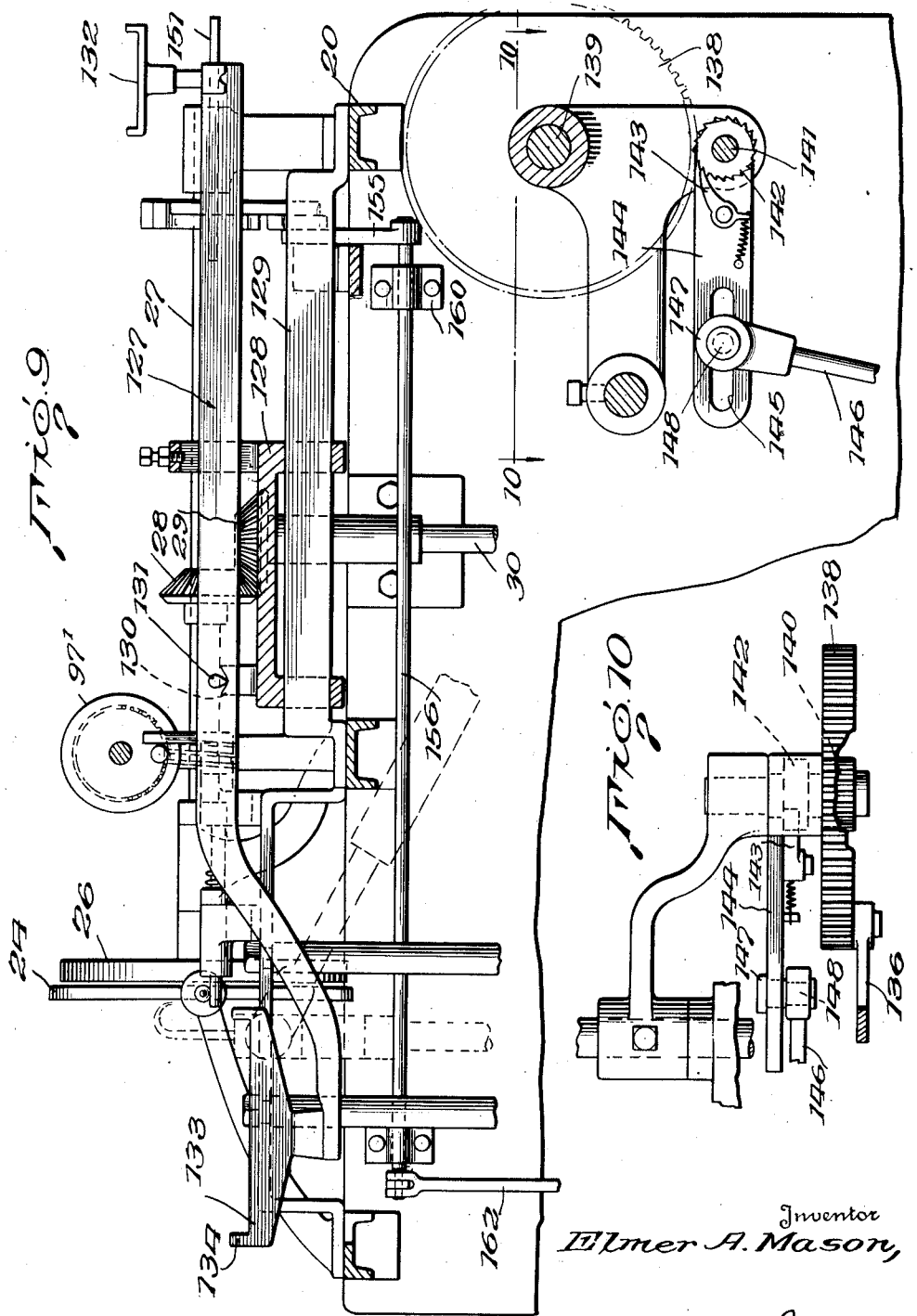

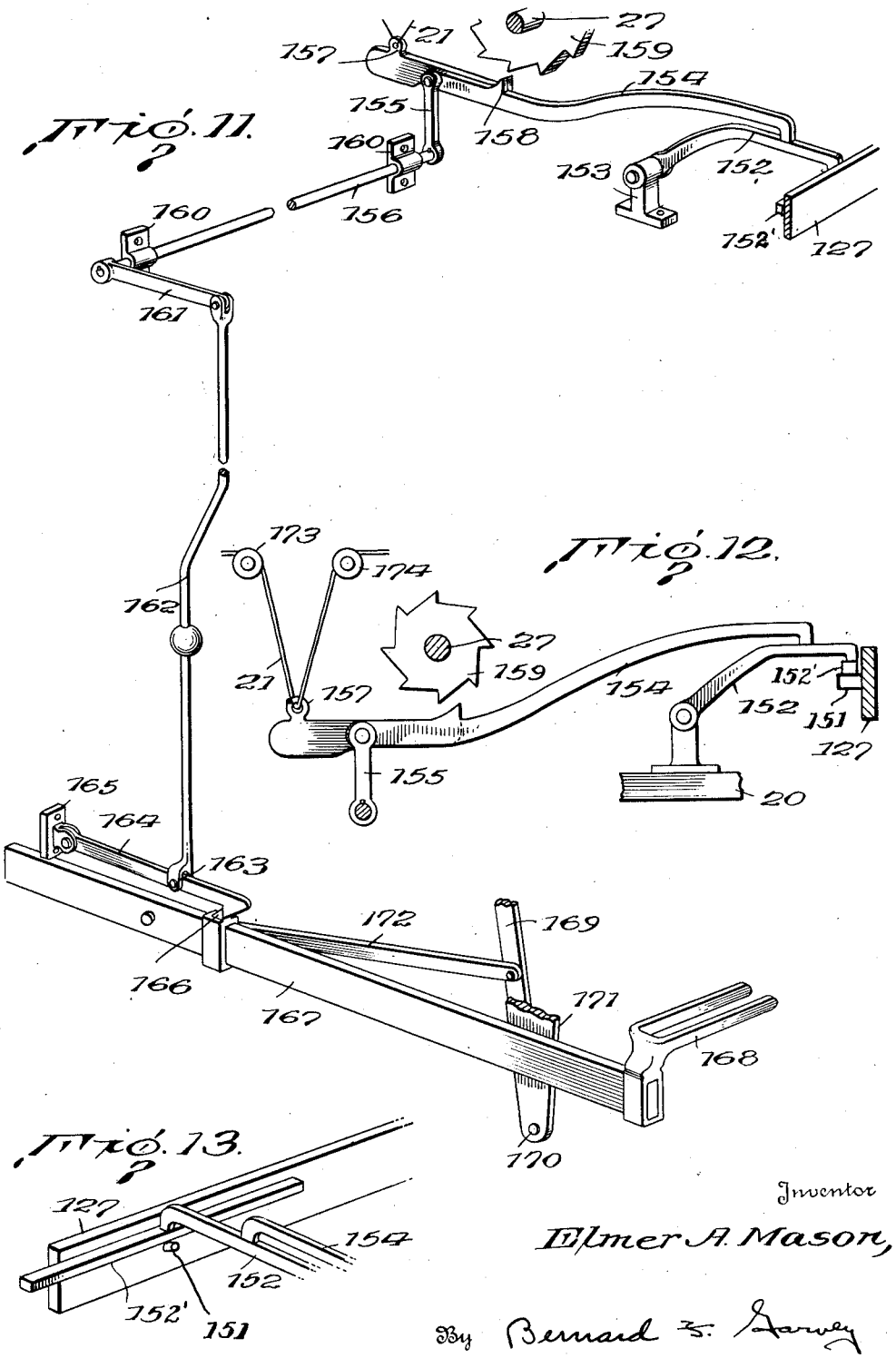

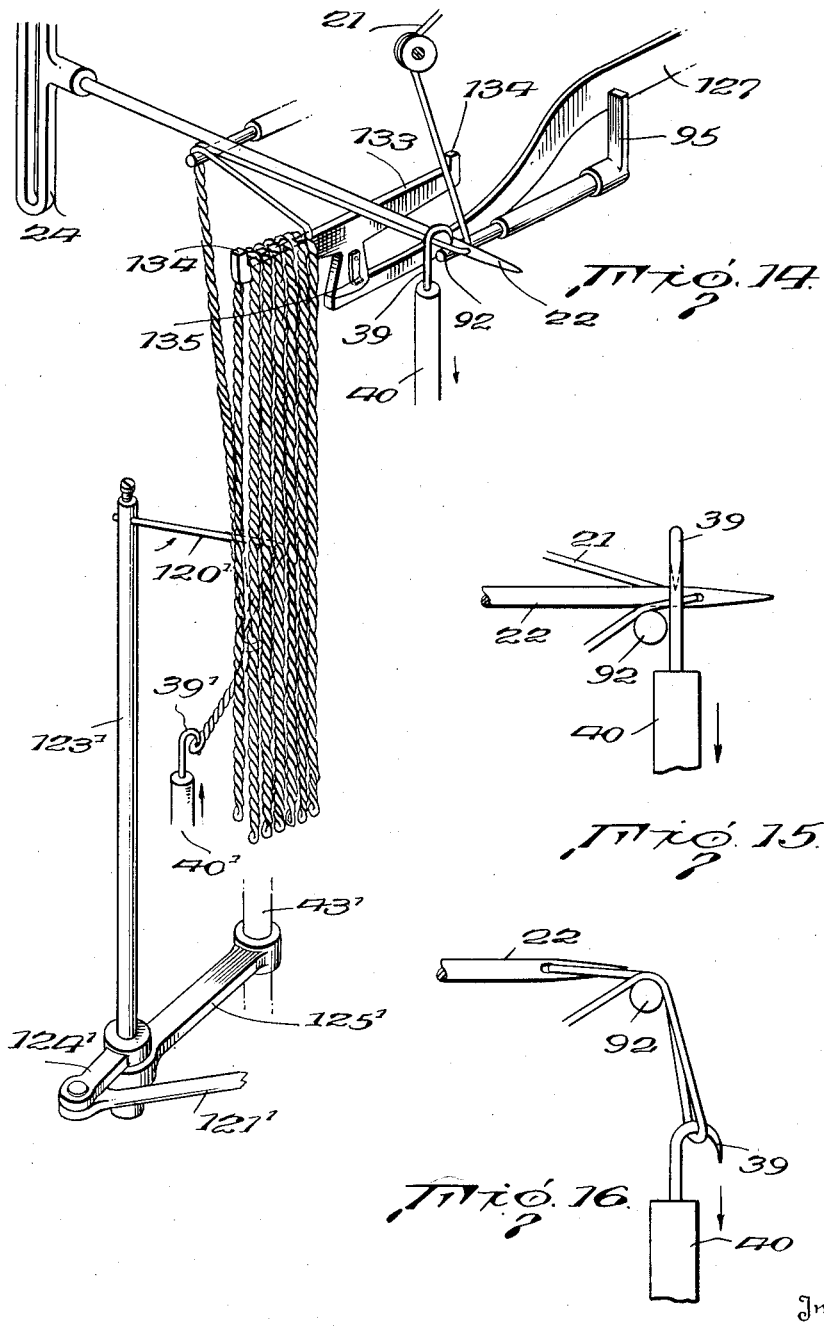

Patented Jan. 14, 1941

2,228,606

UNITED STATES PATENT OFFICE 2,228,606

MOP MAKING MACHINE

Elmer A. Mason, Fall River, Mass., assignor of three-fourths to Michael E. O'Rourke, Francis L. Daylor, and William F. O'Regan, all of Fall River, Mass.

Application August 7, 1936, Serial No. 94,860

17 Claims. (Cl. 57—1)

This invention relates to mop swab making machines and more particularly to a machine for making a ravel-proof mop swab.

An object of this invention is to provide a machine which will produce a mop swab of ravel-proof construction and which will produce a predetermined size of swab automatically.

Another object of this invention is to provide a machine which will produce a ravel-proof mop swab with twisted yarn and which is so constructed that the length of the swab can be varied at will in addition to the variance in the quantity of strands used in the making of a single swab.

A further object of this invention is to provide a machine of this character which will automatically stop when the supply yarn breaks in addition to automatically stopping when a predetermined quantity of yarn strands have been accumulated on the carrier scale.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a detail front elevation of a machine constructed according to an embodiment of this invention.

Figure 2 is a vertical section taken on the line 2—2 of Figure 1.

Figure 3 is a horizontal section taken on the line 3—3 of Figure 2.

Figure 4 is a sectional view taken on the line 4—4 of Figure 3.

Figure 5 is a fragmentary sectional view taken on the line 5—5 of Figure 4.

Figure 6 is a fragmentary sectional view partly in detail of the yarn releasing means for releasing the twisted strands for deposit onto the carrier scale.

Figure 7 is a sectional view taken on the line 7—7 of Figure 2.

Figure 8 is a fragmentary top plan of the machine.

Figure 9 is an enlarged sectional view taken on the line 9—9 of Figure 1.

Figure 10 is a sectional view partly in detail taken on the line 10—10 of Figure 9.

Figure 11 is a perspective view partly broken away of the stop mechanism for automatically stopping the machine when the yarn breaks and for stopping the machine when the desired quantity of material has been deposited on the carrier scale.

Figure 12 is a front elevation partly in section of the stop mechanism.

Figure 13 is a fragmentary perspective view showing the stop levers contacting with the carrier scale.

Figure 14 is a perspective view of the carrier scale together with the hooks for use in twisting the yarn and the means for removing the twisted yarn from the hooks.

Figure 15 is a fragmentary side elevation of one of the hooks in the act of contacting with the yarn carried by the needle.

Figure 16 is a fragmentary side elevation of the hook in its downward movement after receiving the yarn from the needle.

Figure 1:
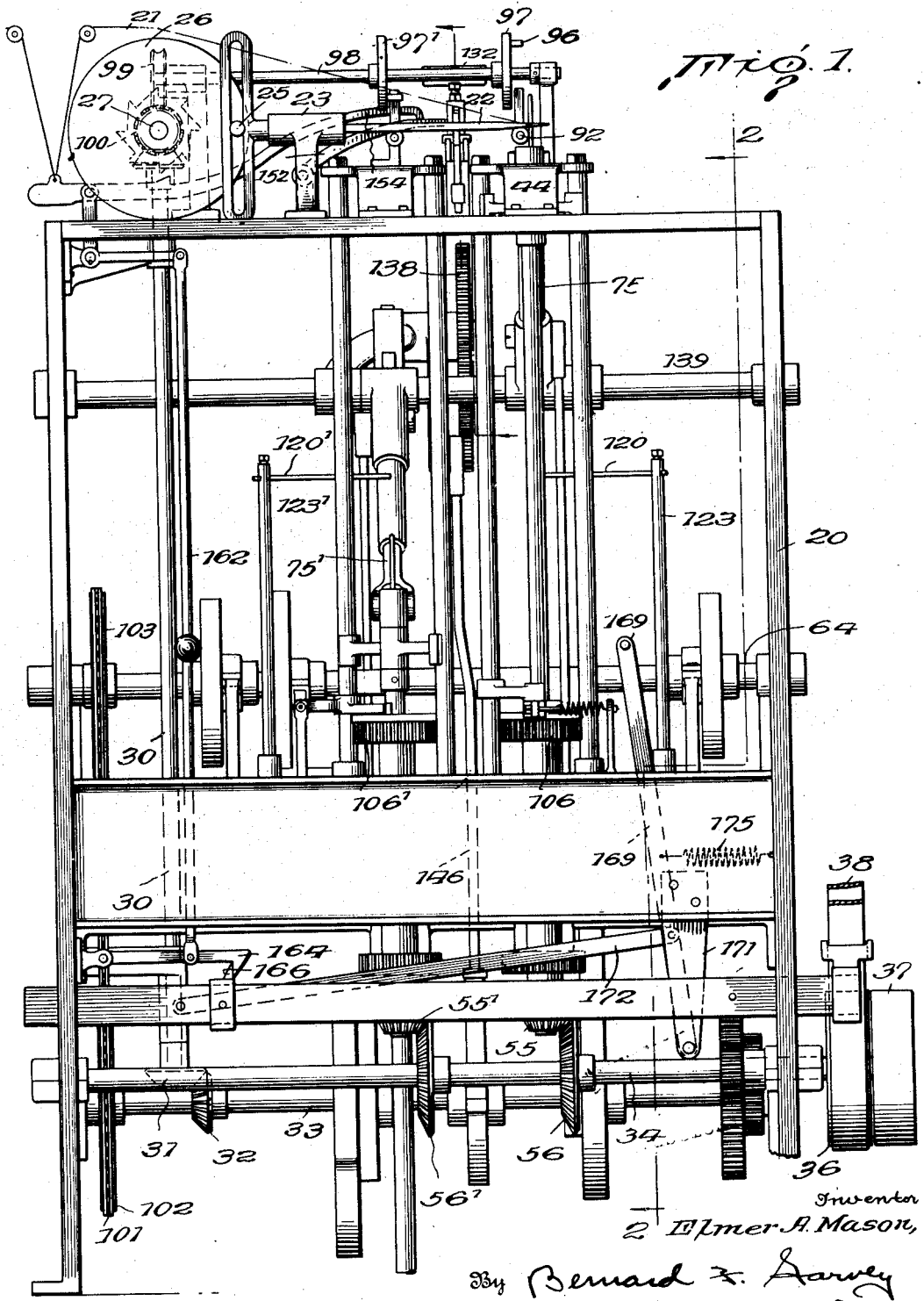

Referring to the drawings wherein like symbols designate corresponding parts throughout the several views, the numeral 20 designates generally a frame structure of suitable construction and the numeral 21 designates a yarn of preferably several strands which is connected at one end to a supply spool. This yarn 21 is passed through the eye of a horizontally slidable needle 22 which is slidable through a bearing 23 carried by the frame 20. The end of the needle opposite from the eye thereof is provided with a guide loop 24 in which an eccentrically mounted pin 25 engages. The pin 25 is mounted on a disk or wheel 26 secured to a driven shaft 27 which is mounted on the upper portion of the frame 20.

The shaft 27 has a bevelled gear 28 secured thereto which meshes with a bevelled gear 29 mounted on the upper end of a vertical shaft 30. A bevelled gear 31 is mounted on the lower end of the shaft 30 and meshes with a bevelled gear 32 which is mounted on a driven shaft 33. The shaft 33 is connected to a drive shaft 34 by a gear train 35. The drive shaft 34 has a pulley 36 fixed thereto and also has a loose pulley 37 mounted thereon. A driving belt 38 engages the pulley 36 and is adapted to be connected to a suitable source of power supply.

A hook 39 is secured to the upper end of a rod 40 which is rotatable in a bearing 41. The bearing 41 is provided with guide arms 42 which engage vertically disposed parallel guide rods 43. The upper ends of the guide rods 43 are secured in a bracket 44 carried by the upper portion of the frame 20. The lower ends of the guide rods 43 are secured to a block 45 carried by a bracket 46 secured to a suitable portion of the frame 20. The hook rod 40 is provided with a longitudinally extending keyway 47 and a key 48 carried by a sleeve 49 slidably engages in the keyway 47. A sleeve 50 loosely engages about the inner sleeve 49 and is provided with an annular flange 51 at its upper end, which engages the upper end of the bushing or bearing 45. A gear 52 is fixed to the lower end of the outer sleeve 50 and meshes with a gear 53 mounted on a shaft 54. The shaft 54 is rotatably carried by the bracket 46 and is provided at its lower end with a bevelled gear 55 which meshes with a bevelled gear 56 mounted on the drive shaft 34.

A clutch collar 57 is mounted about the sleeve 49 being held against rotation by means of a key 58. This clutch collar is adapted to have vertical sliding movement with respect to the sleeve 49 under the action of a bell crank lever 59 carried by a bracket 60. The upper end or face of the annular flange 51 is provided with a clutch member 61 and the lower face of the slidable clutch collar 57 has a clutch member 62 secured thereto for engagement with the clutch member 61 when the bell crank lever 59 is rocked to a clutching position. The gears 52 and 53 will rotate continuously but the sleeve 49 and the hook rod 40 will only rotate when the clutch member 62 engages the clutch member 61.

The bell crank 59 is rocked under the action of a cam 63 which is mounted on a shaft 64. This cam 63 has a cam groove 65 in one face thereof and a roller 66 engages in this cam groove 65. The roller 66 is carried by a forked member 67 and this forked member 67 is provided with bifurcated ends 68 which engage over the shaft 64. A rod 69 is secured at one end to the fork member 67 and this rod 69 slidably engages a bar 70 which is connected to one arm of the bell crank 59 by a pivotal connection 71. A collar 72 is secured in adjusted position to the opposite end of the rod 69 and a second collar 73 is mounted on the rod 69 and constitutes a tensioning means for a spring 74 which is mounted on the rod 69 so that the bell crank 59 will be cushioned in its rocking movement under the action of the cam 63.

The hook 39 and the rod 40 are moved up and down by means of a hook operating lever 75 which is rockably mounted on a stationary rod or shaft 76 carried by the frame 20. One end of the lever 75 has a forked member 77 provided with pins 78 engaging in a grooved collar 79, which is fixed to the rod 40. Preferably, the lever 75 comprises an inner lever portion 80 and an outer lever portion 81 which is slidable within the inner lever portion 80. A weight 82 is adjustably mounted on the lever 75 and substantially balances this lever 75 on the shaft 76. The lever 75 is provided with an elongated slot 83 at one side of the shaft 76 and the upper end 84 of a lever operating rod 85 has a bolt 86 engaging in the slot 83 and this bolt 86 has a nut 87 threaded thereon so that the rod 85 may be adjusted in the slot 83 in order to adjust the vertical movement of the lever 75.

The lower end of the rod 85 has a forked member 88 secured thereto which is provided with a roller 89 engaging in a cam groove 90 of a cam member 91 which is mounted on the shaft 33. This cam 91 is so constructed or formed that upon rotation thereof the lever 75 will be rocked vertically and at each end of travel of the lever 75 there will be a dwell period, as will be hereinafter described.

When the hook 40 is in its uppermost position and is held in this position by the dwell portion of the cam 91, the needle 22 will move horizontally beneath the hook 39 so that the yarn 21 will be passed beneath the hook 39. The needle 22 will move horizontally to a position beyond a yarn holding pin 92 which is slidably mounted on bearings 93 and 94 carried by the frame 20. The pin 92 has an upstanding arm 95 secured thereto which is mounted in the path of an eccentrically mounted pin 96 which is secured to a disk 97 mounted on a shaft 98. The shaft 98 has a spiral gear 99 secured thereto which meshes with a spiral gear 100 fixed to the shaft 27. Downward movement of the lever 75 will cause the hook 39 to engage the yarn 21 and pull this yarn 21 downwardly in a double strand with the yarn 21 engaging over the projecting end of the pin 92 as shown more particularly in Figure 6.

When the lever 75 reaches the lower end of its downward travel the cam 91 will hold the lever in its lowermost position by the dwell period thereof and at this time, the cam 63 will effect operation of the bell crank 59 so as to lower the clutch collar 57 to thereby bring the two clutch members 61 and 62 into engagement with each other, in order to effect rotation of the hook 39 and the rod 40. The shaft 64 is rotated by means of a chain 101 which engages a sprocket 102 mounted on the shaft 33 and a sprocket 103 carried by the shaft 64. Idler sprockets 104 and 105 engage the chain 101 between the sprockets 102 and 103 so as to keep the chain 101 in taut condition.

The shaft 54 has a gear 106 secured to the upper end thereof and this gear 106 meshes with a gear 107 secured to the sleeve 49. This gear 107 has an interrupted part 108 so that at certain times the gear 106 may rotate without rotation of the gear 107. A stop plate 109 is secured to the gear 107 and a pin 110' is carried by the plate 109 on the upper side thereof. A hook positioning lever 111' is mounted on a shaft 112 carried by a bracket 113 which is fixed to one of the rods 43. An arm 114 is carried by the lever 111' and has a spring 115 secured thereto which maintains the lever 111' in the path of the pin 110'. Preferably, the plate 109 engages over the upper end of the sleeve 49 so that the upper end of the sleeve 49 will project through the plate 109 and the lever 111' is adapted to engage the upper end of the sleeve 49 when the pin 110' is out of contact therewith. The opposite end of the spring 115 is secured to a bracket 116 carried by the frame 20. When the rock lever 59 is moved to an inoperative position and the clutch member 62 is moved out of engagement with the clutch member 61, the rod 40 will continue to rotate through the action of the gears 106 and 107 until the gear 106 engages the interrupted part 108 of the gear 107. At this time, the lever 111' will engage the pin 110' and thus return the gear 107 which is free of the gear 106 by reason of the interrupted portion 108, so that the hook 39 will be turned to the proper position to receive the yarn when this hook 39 is again raised to the position shown in Figures 2 and 14.

The gear 107 is also held against rotation by means of a stop lever 117 which is mounted on one of the guide rods 43 and disposed in the path of the stop plate 109. The stop lever 117 is rocked under the action of an operating rod 118 which is moved to an operative or inoperative position by means of a cam 119 mounted on the shaft 64.

After the twisting operation has been completed, the lever 75 rises and at this time, a yarn releasing member 120 is swung into engagement with the twisted yarn above the hook 39 by means of a rod 121 which is operated by means of a cam 122. The yarn releasing member 120 is constructed in the form of a hook which is mounted on a vertically disposed rod 123 and this rod 123 is secured to a horizontally swingable lever 124. An arm or bracket 125 is secured to one of the guide rods 43 and this bracket 125 supports the lever 124 in operative position so that the hook 120 will be disposed in a position for engagement with the twisted yarn or strand 21.

At the time that the twisted strand is released from the hook 39 by the releasing member 120, the pin 96 will engage the arm 95 and move the pin 92 inwardly of the bearing 93 against the tension of the spring 126 so that the strand will then drop onto a movable carriage and scale generally designated as 127. The carrier and automatic scale 127 has a slide 128 engaging a guide member 129 carried by the frame 20 and this slide 128 has an upstanding pair of posts 130 provided with V-shaped upper ends in which trunnions 131 carried by the carrier 127 engage. In this manner, the carrier 127 is swingably mounted on the guide 128 and one end of the carrier 127 is provided with a platform 132 on which suitable weights or the like may be mounted so as to determine the quantity of yarn which is necessary to downwardly rock the opposite end of the carrier. The opposite or forward end of the carrier is provided with a scale member 133 having upstanding end portions 134 to prevent yarn from sliding off thereof and one side of this yarn receiver or scale 133 is provided with a clip 135 beneath which the free end of the yarn is disposed.

The carriage 127 is progressively moved forwardly after the deposit of a twisted strand of yarn upon the scale 133 by means of a rod 136 which is secured at one end to the carriage 127 as at 137, and the opposite end of the rod 136 is secured to a gear 138 which is mounted on a stationary shaft 139 and a relatively small gear 140 mounted on a shaft 141 meshes with this gear 138. The gear 140 is turned by means of a ratchet 142 which is secured to the shaft 141 and a spring pressed pawl 143 carried by a lever 144 is adapted to progressively rotate the gear 140 and the gear 138. The lever 144 has an elongated slot 145 at the end opposite from the pawl 143 and a rod 146 is adjustably mounted in the slot 145 by means of a nut 147 and a bolt 148. The other or lower end of the rod 146 has a split ring 149 which engages a circular cam 150 secured to the shaft 33.

In order to provide a means whereby the machine may be stopped when the scale 133 rocks downwardly or when the yarn 21 breaks, I have provided a pin 151 on one side of the carriage 127 adjacent the rear thereof and a lever 152 pivotally mounted on a bracket 153 has a shoe 152' which rests on this pin 151. A second lever 154 is secured intermediate its ends to an arm 155 fixed to a shaft 156. The lever 154 at one end bears against a top of the lever 152 and the opposite end of the lever 154 has a guide eye 157 through which the strand 21 passes. The lever 154 also has a pawl 158 which is adapted to engage a ratchet 159 mounted on the shaft 27. When the tension on the strand 21 is normal, the strand 21 will pull the pawl 158 downwardly out of engagement with the teeth of the ratchet 159. The shaft 156 is mounted on bearings 160 carried by the frame 20 and a second arm 161 is secured to the shaft 156 and has a rod 162 secured thereto. The lower end of the rod 162 is secured as at 163 to a pawl 164 mounted on a bracket 165. This pawl 164 is adapted to engage a lug 166 carried by a belt shifter rod 167 having a fork 168 at one end thereof. The belt shifter rod 167 may also be moved manually by means of a lever 169 which is pivoted at 170 to a bracket 171 and the lever 167 is connected by means of a link 172 to the shifter rod 167.

The yarn 21 passes over a pair of spaced apart guide members 173 and 174 with the guide eye 157 engaging the yarn between and below the guide members 173 and 174. The shifter lever 169 is constantly urged forwardly by means of a spring 175 which is secured at one end to the lever 169 and at the other end to the frame 20.

A second hook 39' is disposed on the side of the scale 133 opposite from the hook 39 and is secured to a rod 40'. This rod 40' is moved vertically by means of a lever 75' and the operating means for the lever 75' and the twisting means for the hook 39' and the rod 40' are similar in every detail to the lever operating means for the lever 75 and the rod 40. Inasmuch as the operating means for the second hook 39' is similar to the operating means for the hook 39 and the same characters of reference are applied to the operating means for the hook 39' as for the hook 39, a further description of this operating means is believed unnecessary.

In the use and operation of this machine, the yarn 21 which, in the present instance, is formed of two strands of material is taken from the supply spool or spindle and then passed over the guide member 173 through the eye 157 and then over the guide 174. The strand is then passed through the eye of the needle 22, and clamped beneath the clip 135. The machine may be set in motion by moving the hand lever 169 forwardly to shift the belt on the drive pulley 36 and at this time the pawl 164 will engage the lug 166 to hold the belt shifting member 167—168 in operative position.

The hook 39 will engage the yarn 21 and the lever 75 will then swing downwardly under the action of the cam 91 thus drawing the yarn 21 downwardly over the pin 92. When the lever 75 reaches its lowermost position, the cam 63 will effect rocking of the bell crank 59 so as to move the clutch collar 57 downwardly and thus bring the clutch members 61 and 62 into contact with each other. When the clutch members 61 and 62 are in contacting relation, the gear 52 will cause the rod 40 to rotate and, at the same time, the gears 106 and 107 will rotate at the same speed. The cam 63 will maintain the clutch collar 57 in a clutching position a sufficient length of time to twist the strand 21 for the desired number of turns and then the cam 63 will move the clutch collar 57 into released position. Assuming that the gears 106 and 107 are meshing with each other with the clutch collar 57 in released position, the rod 40 will be rotated for a partial rotation until the gear 107 turns to the point where the interrupted portion 108 is opposite the teeth of the gear 106. Simultaneously with the release of the clutch collar 57, the cam 119 will effect inward movement of the locking member 117 which will frictionally engage the locking plate 109. As soon as the gear 107 turns to the point where the interrupted portion 108 is opposite the teeth of the gear 106 the spring pressed lever 111 will engage the pin 110 on the plate 109, as shown in Figure 3, so as to rotate the rod 40 to the position where the hook 39 will be in a proper position to engage the yarn 21 when the hook 39 is again in its uppermost position.

After the hook 39 has been turned to the proper receiving position, the cam 122 will swing the yarn releasing member 120 forwardly, as shown in Figure 14, so as to bend the yarn in order that when the hook 39 is moved upwardly the loop of the yarn about the hook 39 will be pulled off and the twisted strand thus released from the hook 39. The same operation takes place with the hook 39' with the exception that the hook 39' is in the opposite position from the hook 39. In other words, when the hook 39 is in the uppermost or receiving position, the hook 39' is in the lowermost position, as shown in Figure 14. When the twisted strand has been released from the hook 39, the pin 96 will engage the arm 95 so as to move the pin 92 to a released position in order to deliver the twisted strand to the scale 133. At this time, the carriage 137 is moved forwardly one degree by rotation of the eccentric 150 which will rock the lever 144 and thus turn the gear 140 forwardly one division.

When the desired number of twisted strands have been laid on the scale 133 the weight of these strands will rock the scale 133 downwardly and movement in a downward direction of the scale 133 will raise the pin 151 which, in turn will rock the lever 152 and the lever 154 upwardly. Upward movement of the lever 154 will bring the lug 158 into engagement with a tooth of the ratchet 159 and, at the same time, the arm 155 which is fixed to the lever 154 will rock the shaft 156 and release the pawl 164 from the lug 166 so that the spring 175 will move the belt shifter 167—168 to carry the belt 38 from the driving pulley 36 to the idler pulley 37. In this manner, the machine is automatically stopped when the desired quantity of yarn has been accumulated on the scale 133. The operator of the machine will then cut off the yarn at the end of the accumulated swab on the scale 133 and then clamp the free end of the yarn 21 on the clip 135. The scale 133 may then be raised and manually returned whereupon the operator may then move the lever 169 forwardly to shift the belt 38 onto the driving pulley 36 and again set the machine into operation.

In the event the yarn 21 breaks between the supply spool or spindle and the needle 22, the tension on the lever 154 at the eye 157 will be released and this lever 154 will then swing upwardly to bring the lug 158 into engagement with the ratchet 159 and thus through the shaft 156 and the rod 162 the pawl 164 will be raised to permit the spring 175 to shift the belt shifter 167—168 from the driving pulley 36 to the idler pulley 37.

The machine hereinbefore described will automatically produce a mop swab of the desired size which may be sewed together, that is the several strands forming the swab may be wrapped with a strip of material at the center and this material then secured to the strands by stitching or the like. The mop swab produced by this machine will be of the twisted strand variety and each strand will be formed of four strands of yarn but it will, of course, be understood that the size of the twisted strands may be varied at will depending only upon the number of strands 21 which are initially used from the supply means. This mop swab will not ravel in the use thereof due to the fact that each strand is formed of looped material and the strand is endless and in this manner the swab will not leave ravellings on the floor during the use thereof as is customary with mop swabs formed of cut strands.

It is obvious that various changes and modifications may be made in the details of construction and design of the above specifically described embodiment of this invention without departing from the spirit thereof, such changes and modifications being restricted only by the scope of the following claims.

What is claimed is:

1. A mop swab machine comprising a twisting means, a carriage for receiving the material from said twisting means, and means connected to said carriage and active when a predetermined quantity of material has been deposited on said carriage for stopping said twisting means.

2. A mop swab machine comprising a twisting means, a carriage movable relative to said twisting means, operating means for said twisting means, and means connected to said carriage and said operating means for disconnecting said operating means when a predetermined quantity of material has been deposited on said carriage.

3. A mop swab machine comprising a frame, a yarn twisting member in the frame, means for slidably mounting said member in the frame, means for moving said member in the frame, means at one end of the movement of said member for delivering untwisted yarn to said member, means at the other end of the movement of the member for rotating the member whereby to twist the yarn, means active after the yarn has been twisted for removing the yarn from the hook, a combined carriage and scale in the frame, and means for delivering the twisted yarn to said carriage and scale.

4. A mop swab machine comprising a frame, a yarn twisting member in the frame, means for slidably mounting said member in the frame, a rock lever connected to said member, means for rocking said lever, means at one end of the movement of said member for delivering untwisted yarn to said member, means at the other end of the movement of the member for rotating the member whereby to twist the yarn, means active after the yarn has been twisted for removing the yarn from the hook, a combined carriage and scale in the frame, means for delivering the twisted yarn to said carriage and scale, and means for automatically stopping the machine when a predetermined quantity of twisted yarn has been delivered to said carriage and scale.

5. A mop swab machine comprising a frame, a yarn twisting member in the frame, cam operated means connected to said member for reciprocating said member in the frame, means at one end of the movement of the member for delivering untwisted yarn to the member, means at the other end of the movement of the member for rotating the member whereby to twist the yarn, and means active when the yarn has been twisted to position said member in a yarn receiving position.

6. A mop swab machine comprising a frame, a yarn twisting hook in the frame, cam operated means connected to said hook for reciprocating said hook in the frame, means at one end of the movement of the hook for delivering untwisted yarn to the hook, means at the other end of the movement of the hook for rotating the hook whereby to twist the yarn, means active when the yarn has been twisted to position said hook in a yarn receiving position, and means active after the hook has been returned to a yarn receiving position for removing the yarn from the hook.

7. A mop swab machine comprising a frame, a pair of spaced apart yarn twisting hooks in the frame, cam operated means connected to said hook for reciprocating said hooks in the frame, said hooks moving in opposite directions to each other, means at one end of the movement of the hooks for delivering untwisted yarn thereto, means at the other end of the movement of the hooks for rotating the hooks whereby to twist the yarn, a rock member disposed between the hooks and adapted to receive the twisted yarn therefrom, and automatically operated stopping means engaging said rock member for holding said rock member against rocking movement until a predetermined quantity of yarn has been deposited thereupon.

8. A mop swab machine comprising a frame, a pair of spaced apart yarn twisting hooks in the frame, cam means connected to said hooks for reciprocating said hooks, means at one end of the movement of the hooks for delivering untwisted yarn thereto, means at the other end of the movement of the hooks for rotating the hooks whereby to twist the yarn, operating means for said cam means and said rotating means, a rock member disposed between the hooks and adapted to receive the twisted yarn therefrom, and adjustable means connected to said rock member and said operating means for disconnecting said operating means when a predetermined quantity of twisted yarn has been deposited on said rock member.

9. A mop swab machine comprising a frame, a pair of spaced apart yarn twisting hooks in the frame, cam means connected to said hooks for reciprocating said hooks, means at one end of the movement of the hooks for delivering untwisted yarn thereto, means at the other end of the movement of the hooks for rotating the hooks whereby to twist the yarn, a carriage slidably carried by the frame, a yarn receiving member rockably carried by said carriage, means engaging said yarn receiving member and connected to the operating means for the machine for stopping the operating means when a predetermined quantity of twisted yarn has been deposited on said yarn receiving member, and means for moving said carriage forward one division when a twisted strand has been delivered to the carriage.

10. A mop swab machine comprising a frame, a pair of spaced apart yarn twisting hooks in the frame, cam means connected to said hooks for reciprocating said hooks, means at one end of the movement of the hooks for delivering untwisted yarn thereto, means at the other end of the movement of the hooks for rotating the hooks whereby to twist the yarn, operating means for said cam means and said rotating means, a carriage slidably carried by the frame, a yarn receiving member rockably carried by said carriage, means engaging said yarn receiving member and connected to said operating means for rendering said operating means ineffective when a predetermined quantity of twisted yarn has been delivered to said yarn receiving member, means for successively moving the carriage forward one division when a twisted strand has been delivered to the yarn receiving member, and means for removing the twisted yarn from the hooks.

11. A mop swab machine comprising a frame, a pair of spaced apart reciprocable yarn twisting hooks in the frame, means for reciprocating said hooks, a yarn delivering member disposed at one end of the movement of the hooks for selectively delivering the yarn to a hook disposed in yarn receiving position, means at the other end of the movement of the hooks for rotating the hooks whereby to twist the yarn, clutch means associated with said rotating means, timed means connected to said clutch means for operation thereof, means active upon release of said clutch means for positioning said hooks in a yarn receiving position, and means operable after said hooks have been positioned in a yarn receiving position to remove the twisted yarn therefrom.

12. A mop swab machine comprising a frame, a pair of spaced apart reciprocable yarn twisting hooks in the frame, means for reciprocating said hooks, a yarn delivering member disposed at one end of the movement of the hooks for selectively delivering the yarn to a hook disposed in yarn receiving position, means at the other end of the movement of the hooks for rotating the hooks whereby to twist the yarn, clutch means associated with said rotating means, timed means connected to said clutch means for operation thereof, means active upon release of said clutch means for positioning said hooks in a yarn receiving position, means operable after said hooks have been positioned in a yarn receiving position to remove the twisted yarn therefrom, a yarn receiving member disposed between the hooks, and means active after the yarn has been disengaged from the hooks for delivering the twisted yarn to said receiving member.

13. A mop swab machine comprising a pair of twisting members, means selectively delivering yarn to said members, means for removing the twisted yarn from said members when the yarn has been twisted to a predetermined degree, and means intermediate said members for supporting the twisted yarn.

14. A mop swab machine comprising a reciprocable twisting member, means for delivering yarn to said member at the end of one stroke thereof, means at the end of the opposite stroke thereof for rotating said member, means active during the movement of said member on said one stroke for removing the twisted yarn therefrom, and means active prior to the operation of said latter means for positioning said hook in a yarn receiving position.

15. A mop swab machine comprising a strand twisting means, means for delivering yarn to said twisting means, and means operable by the weight of the twisted strands for stopping said twisting means.

16. A mop swab machine comprising a pair of spaced apart strand twisting members, operating means for said twisting members, means disposed between said members for supporting the twisted strands, and means for delivering the strands to said supporting means.

17. A mop swab machine comprising a pair of spaced apart strand twisting members, operating means for said twisting members, means disposed between said members for supporting the twisted strands, means for delivering the strands to said supporting means, and means connected to said operating means and said supporting means for stopping said operating means when a predetermined quantity of yarn is deposited on said supporting means.

ELMER A. MASON.